Figure 1:
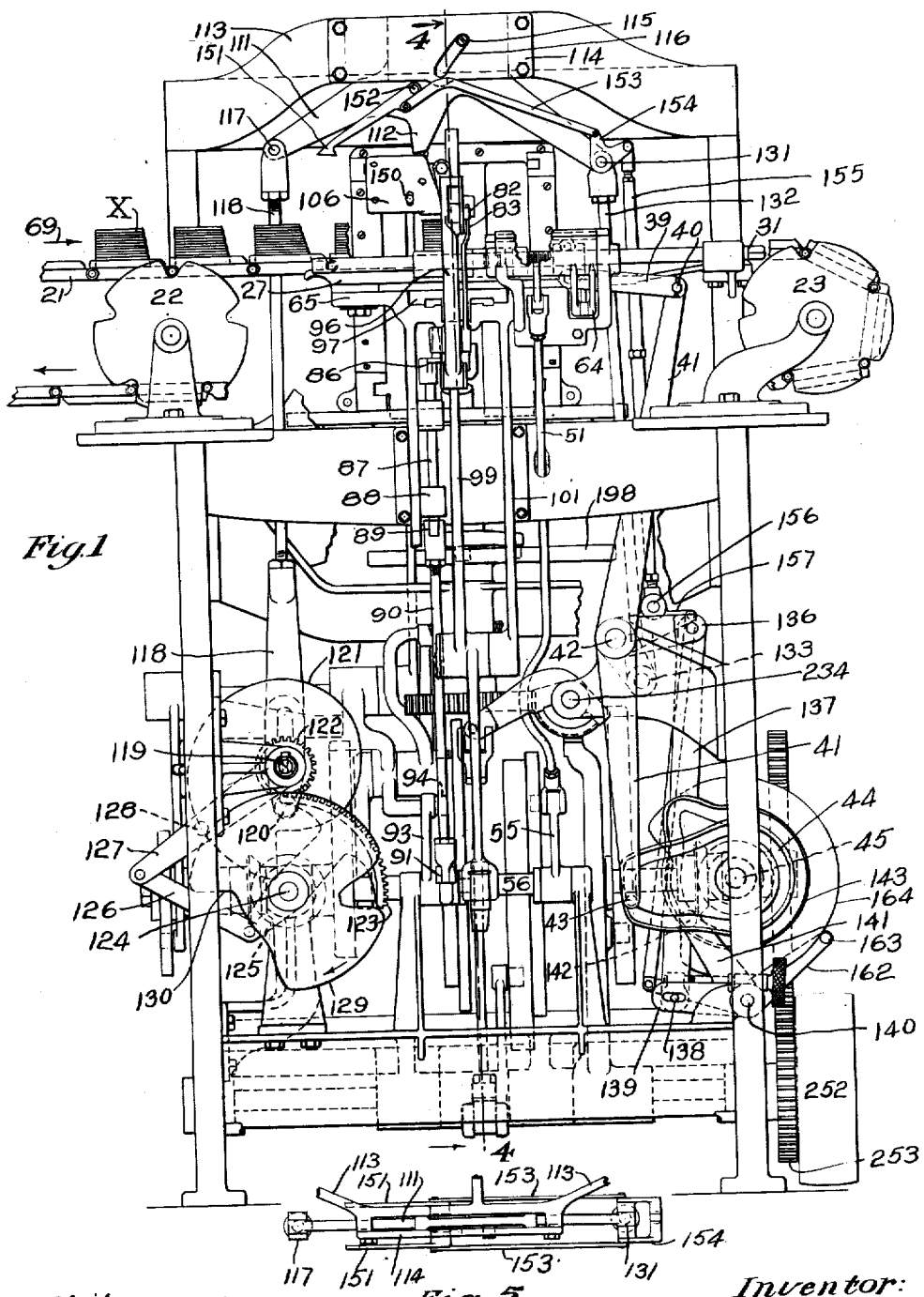

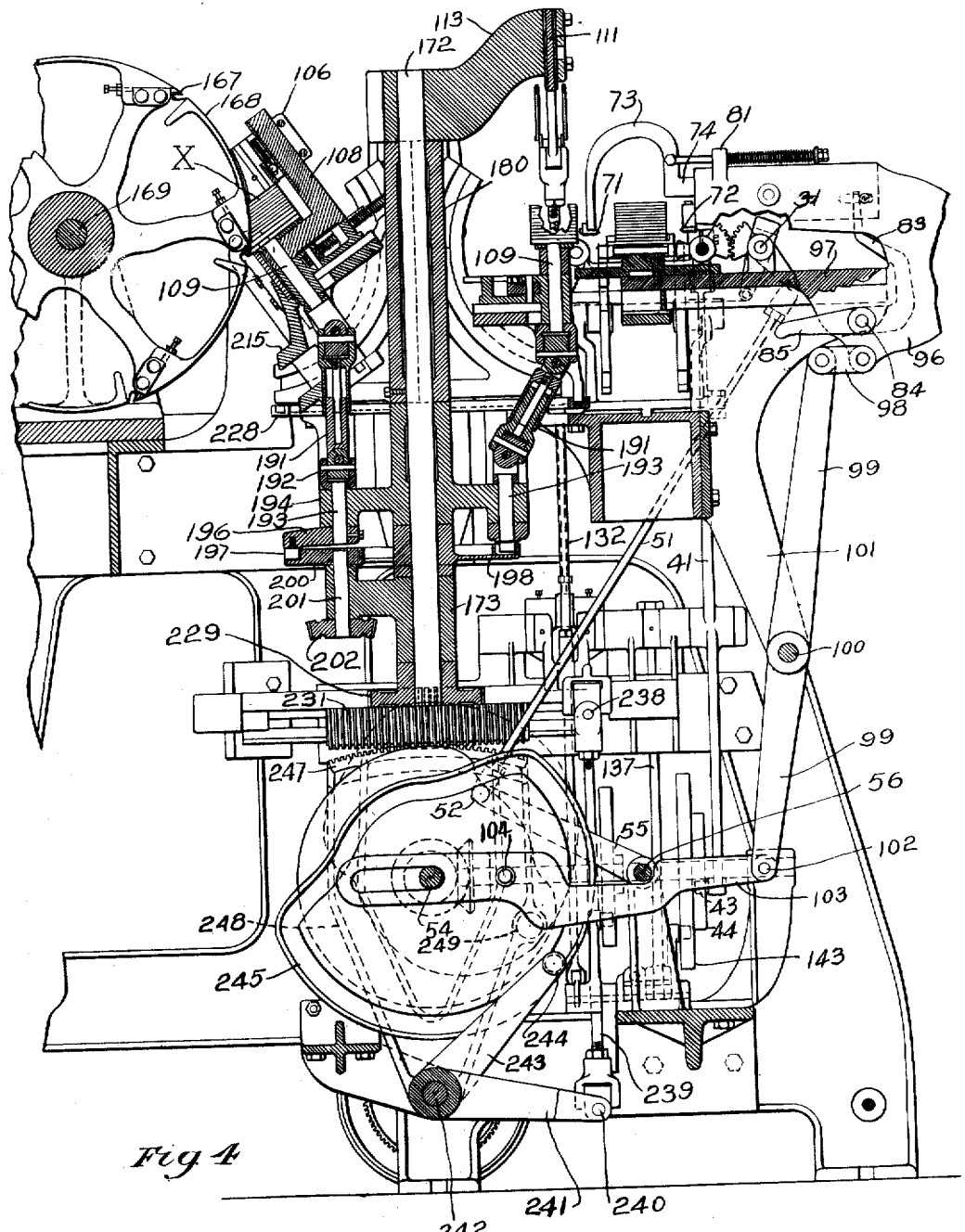

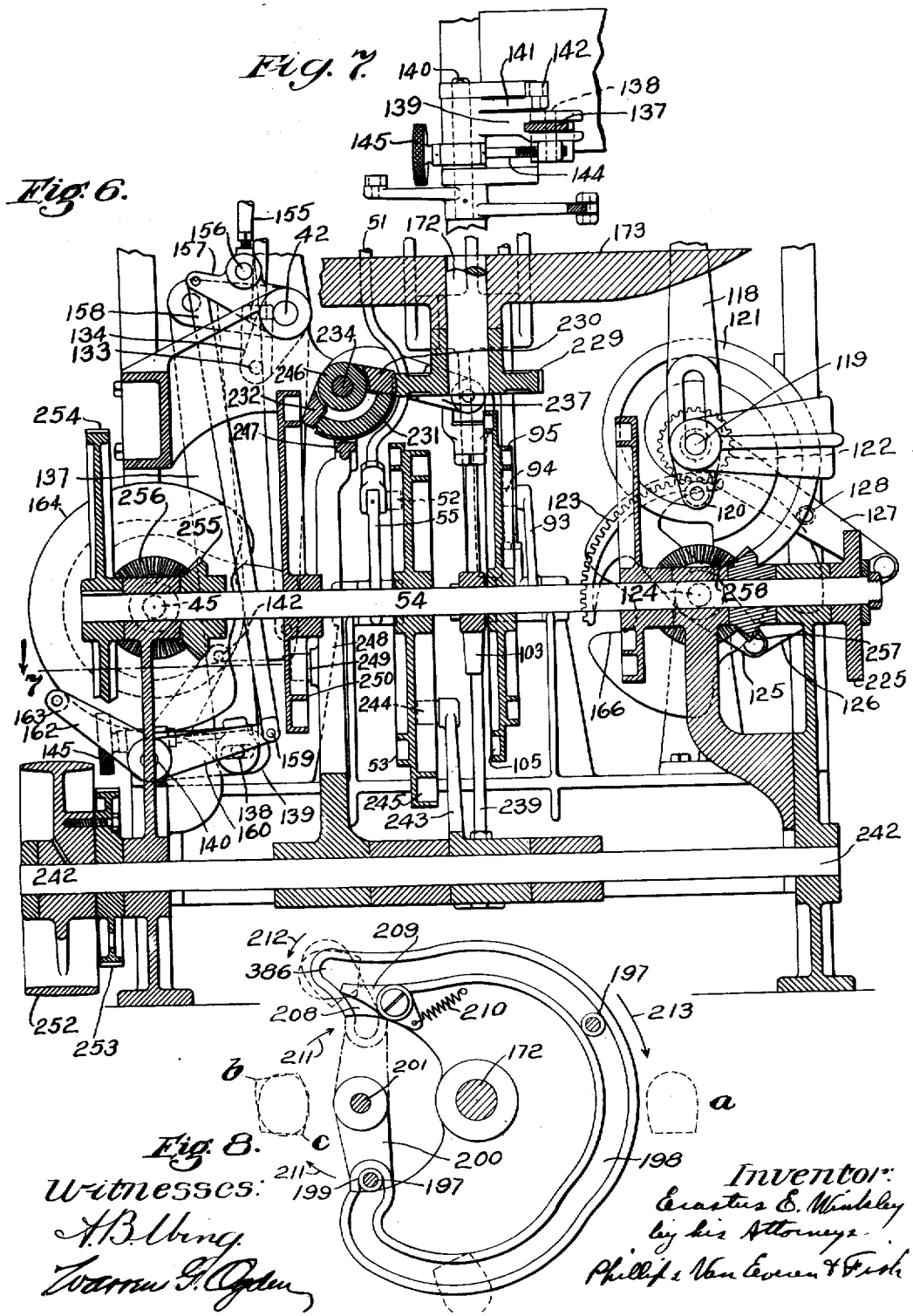

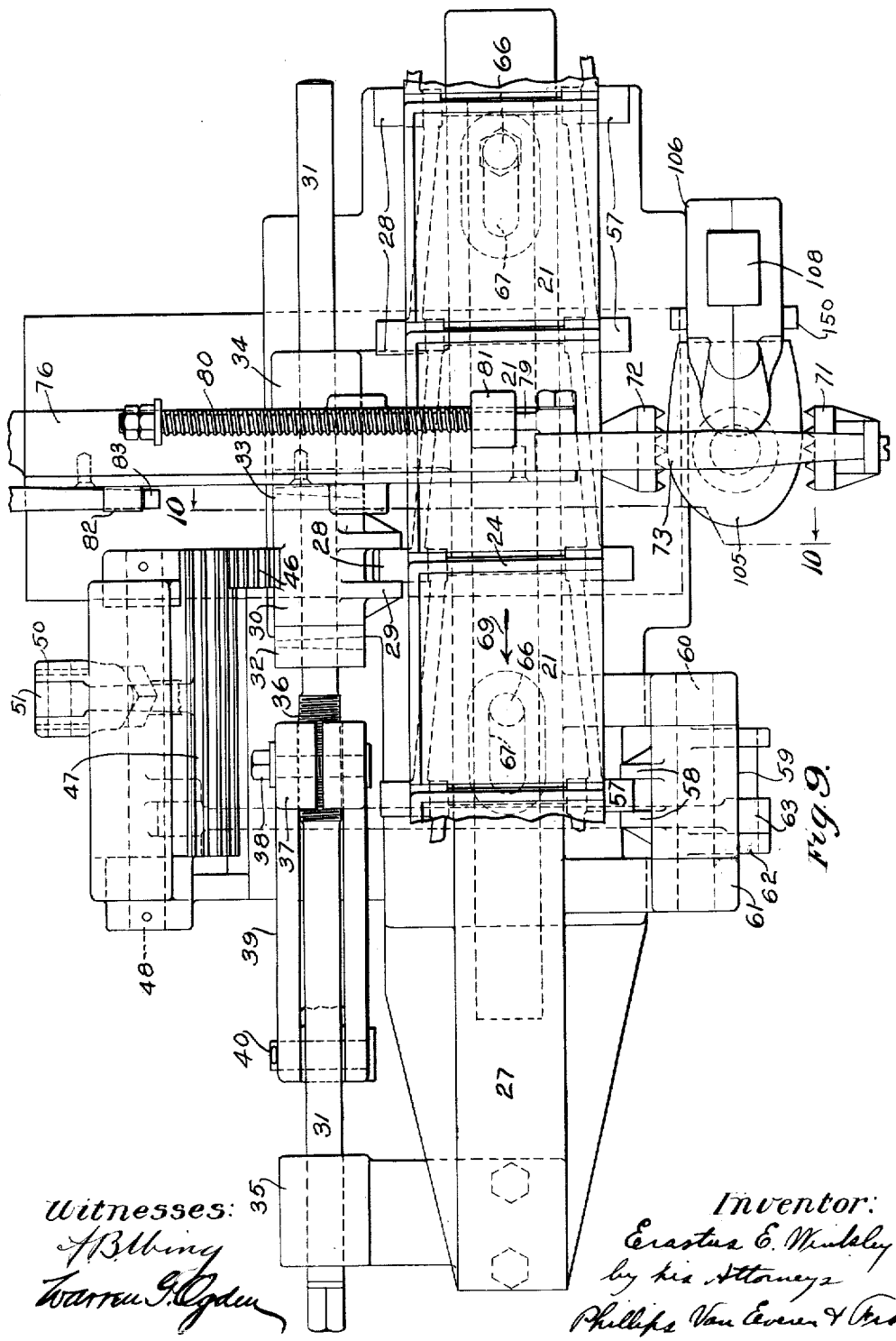

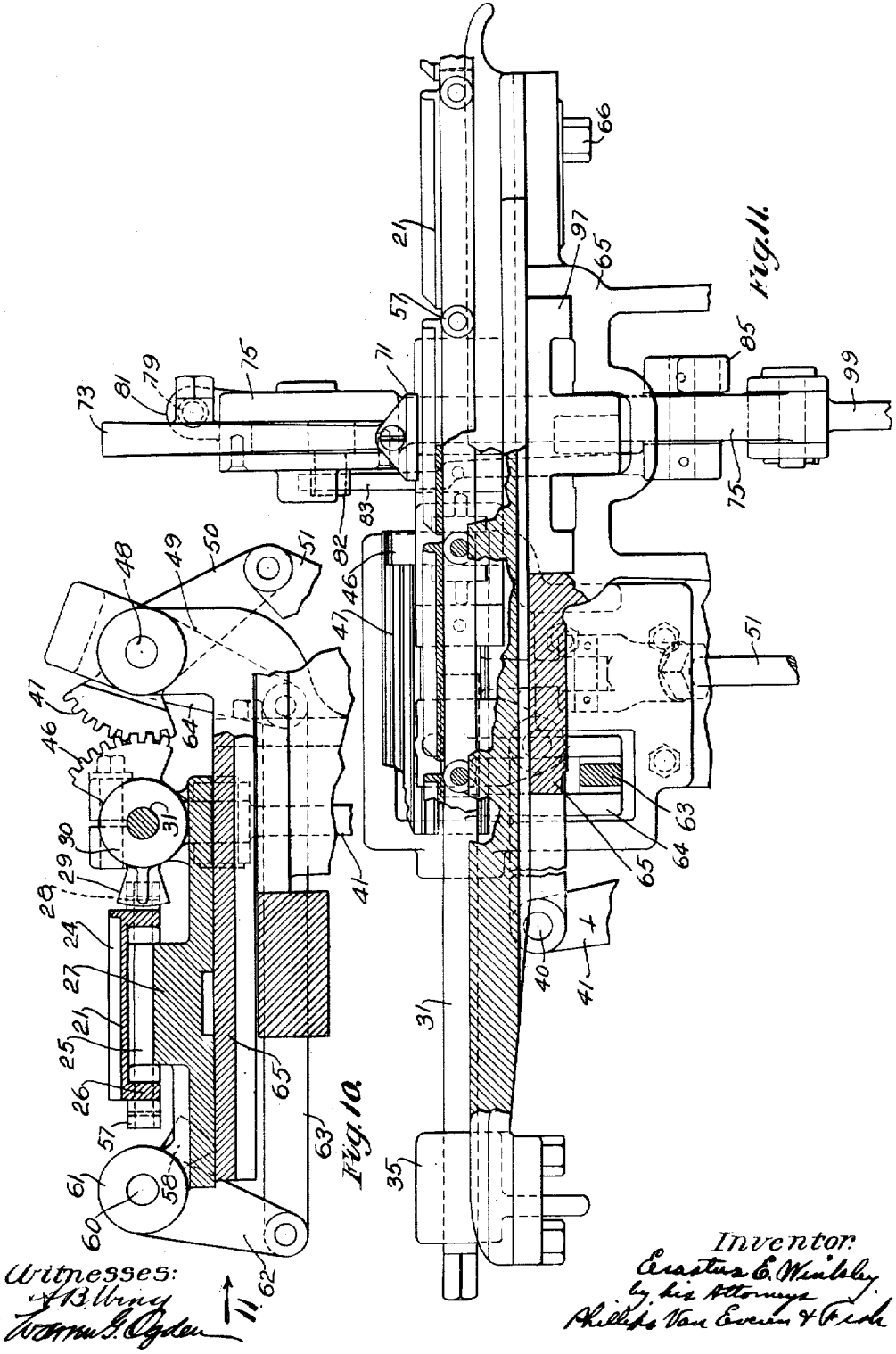

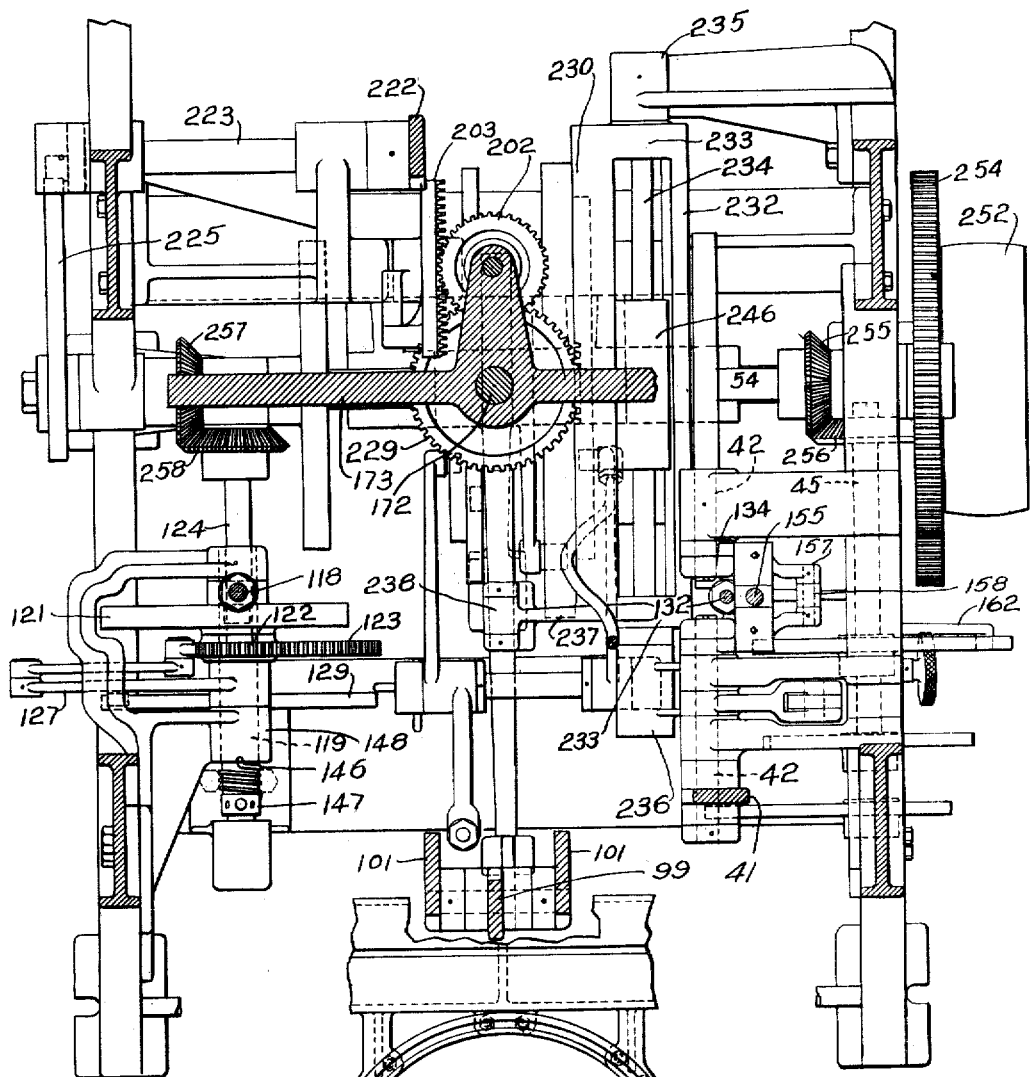

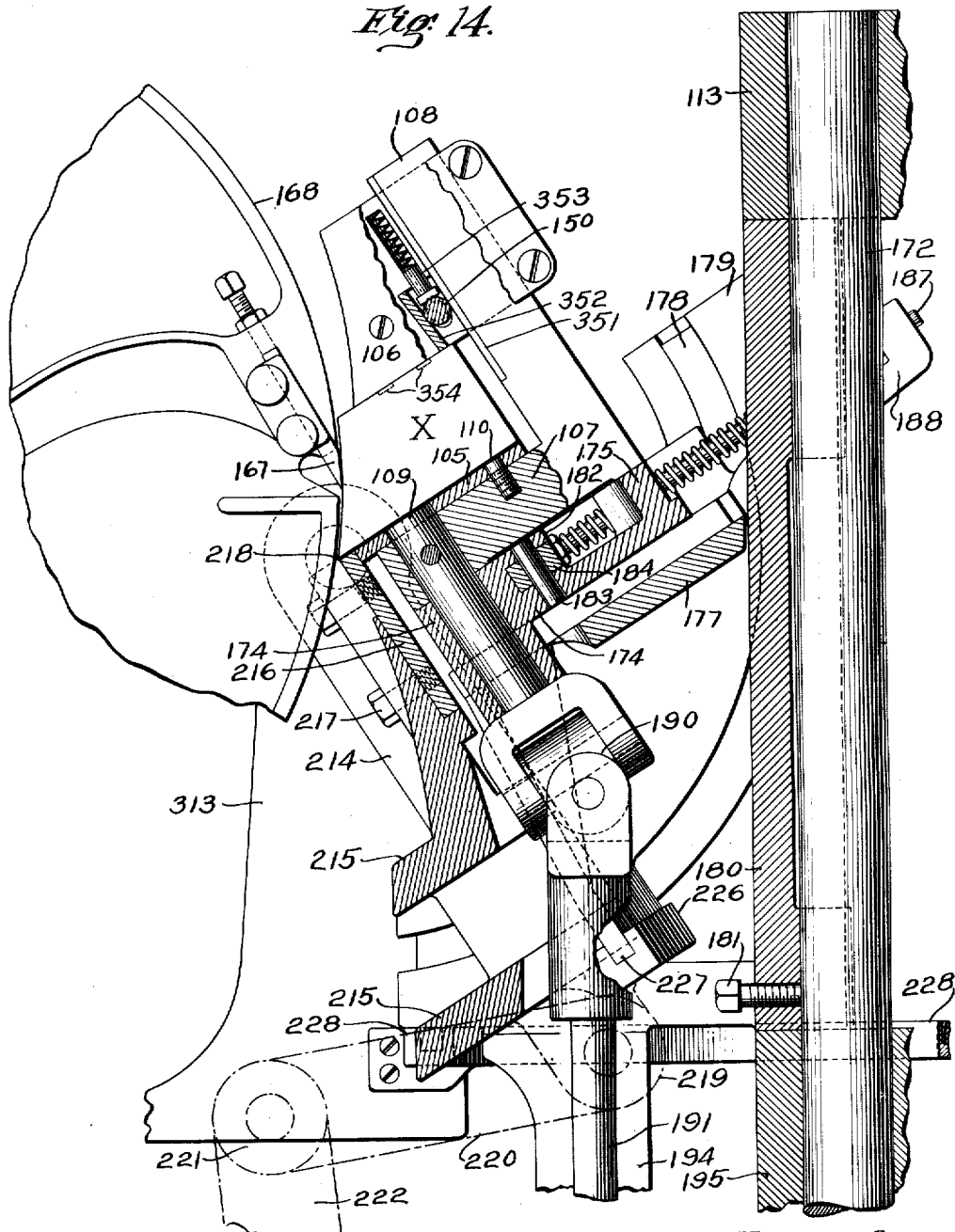

E. E. WINKLEY.
MACHINE FOR OPERATING ON SHOE HEELS.
APPLICATION FILED AUG. 26, 1910.

1,102,310.

Patented July 7, 1914.
10 SHEETS—SHEET 10.

Witnesses:
A. B. Uring.
Warren G. Ogden.

Inventor:
Erastus E. Winkley
by his Attorneys
Phillips Van Everen & Fish

UNITED STATES PATENT OFFICE.

ERASTUS E. WINKLEY, OF LYNN, MASSACHUSETTS.

MACHINE FOR OPERATING ON SHOE-HEELS.

1,102,310.

Specification of Letters Patent.

Patented July 7, 1914.

Application filed August 26, 1910. Serial No. 579,110.

*To all whom it may concern:*

Be it known that I, ERASTUS E. WINKLEY, a citizen of the United States, residing at Lynn, in the county of Essex and State of Massachusetts, have invented certain new and useful Improvements in Machines for Operating on Shoe-Heels; and I do hereby declare the following to be a full, clear, and exact description of the invention, such as will enable others skilled in the art to which it appertains to make and use the same.

The present invention relates to machines for making heels which are used in the manufacture of boots and shoes and more particularly to machines for shaping the peripheral surface of rough heels.

The object of the invention is to produce a heel shaping machine in which the heels are automatically shaped into finished form. With this object in view, a feature of the present invention contemplates the provision, in a heel shaping machine provided with a suitable tool, a heel-clamp or carrier, and mechanism for relatively actuating the clamp or carrier and the tool to cause the latter to operate upon the heel in the clamp or carrier, of mechanism operating automatically for introducing the heel into the clamp or carrier. Broadly considered, the heel may be introduced into the heel clamp or carrier from any suitable form of conveyer as may be found desirable or expedient. It is contemplated that the automatic heel shaping machine produced by the present invention will form a part of a system of automatic machines for producing heels, and it is for that reason adapted to operate automatically upon rough heels conveyed to it automatically from an antomatic heel block sawing machine and also to deliver its product automatically for conveyance to another automatic machine for performing a subsequent operation upon the heel. Therefore, in the preferred form of the invention a link conveyer is loaded with rough heels, one to a link, and is intermittently fed and brought to rest with a rough heel located properly for the operation of the automatic mechanism which takes the rough heel and delivers it to the cutter for the shaping operation. Meanwhile, a shaped heel is substituted in place of the rough heel previously removed from the conveyer, and the conveyer is again fed to advance the finished heel and bring another rough heel in position for removal to the shaping cutter. This manner of delivering the rough heels to and the shaped heels from the machine forms an important feature of the present invention.

A further feature of the present invention consists in the construction and arrangement of the heel-carrier.

In the preferred embodiment of the invention, the heel carrier carries two heel clamps and is rotated through half revolutions to bring one heel clamp into operative relation with the tool and the other heel clamp into position for the automatic substitution of another rough heel for the finished heel therein. By this convenient arrangement the shaping of the rough heels is rapidly performed with a minimum loss of time between successive shaping operations.

These and other features of the invention including improved means for presenting and delivering work to and from an operating tool, and improved means for manipulating the work while being operated upon, will be more fully set forth in the following description and their true scope defined in the appended claims.

The preferred form of the invention is illustrated in the accompanying drawings.

Figure 2:
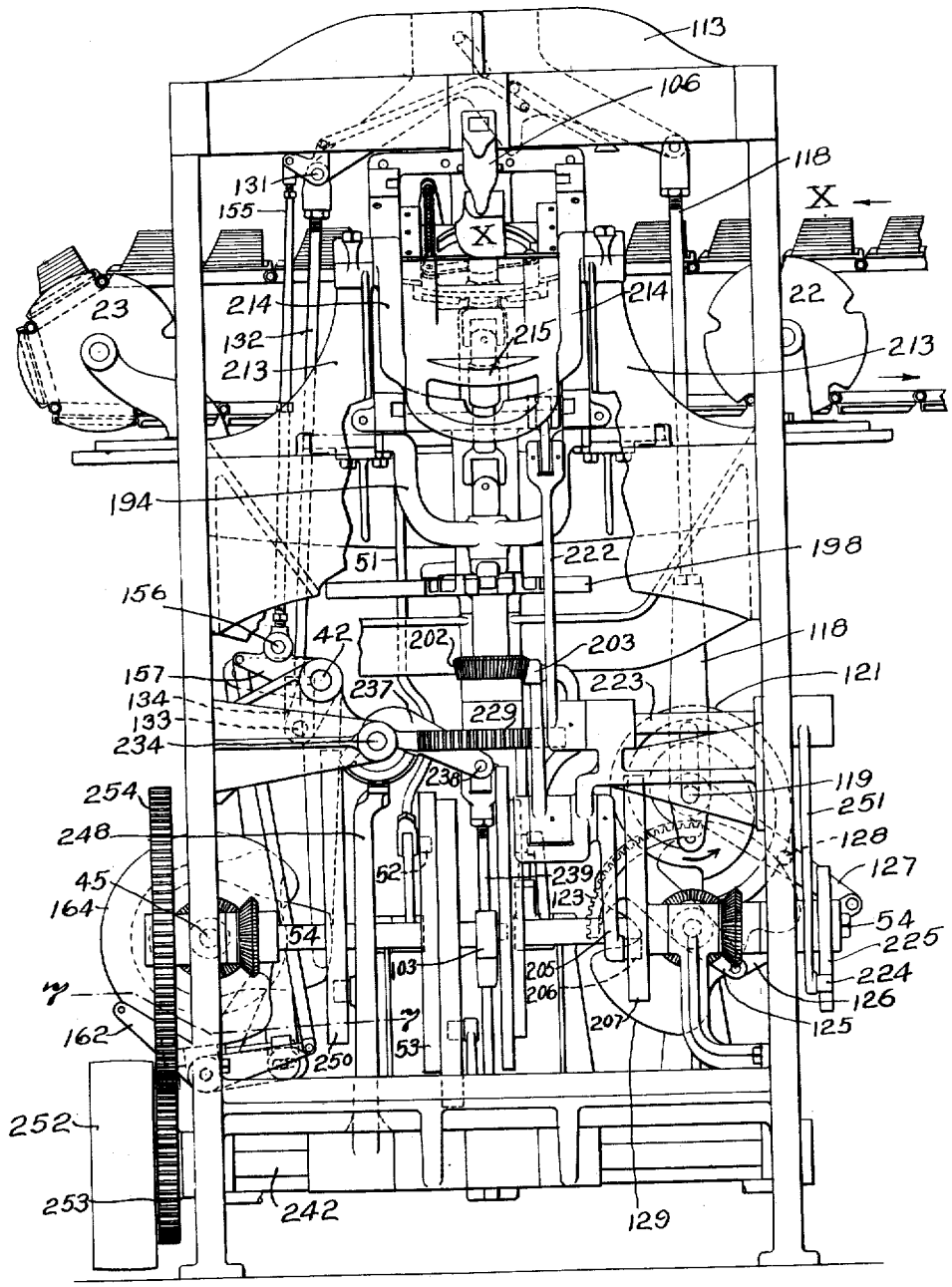
Figure 3:
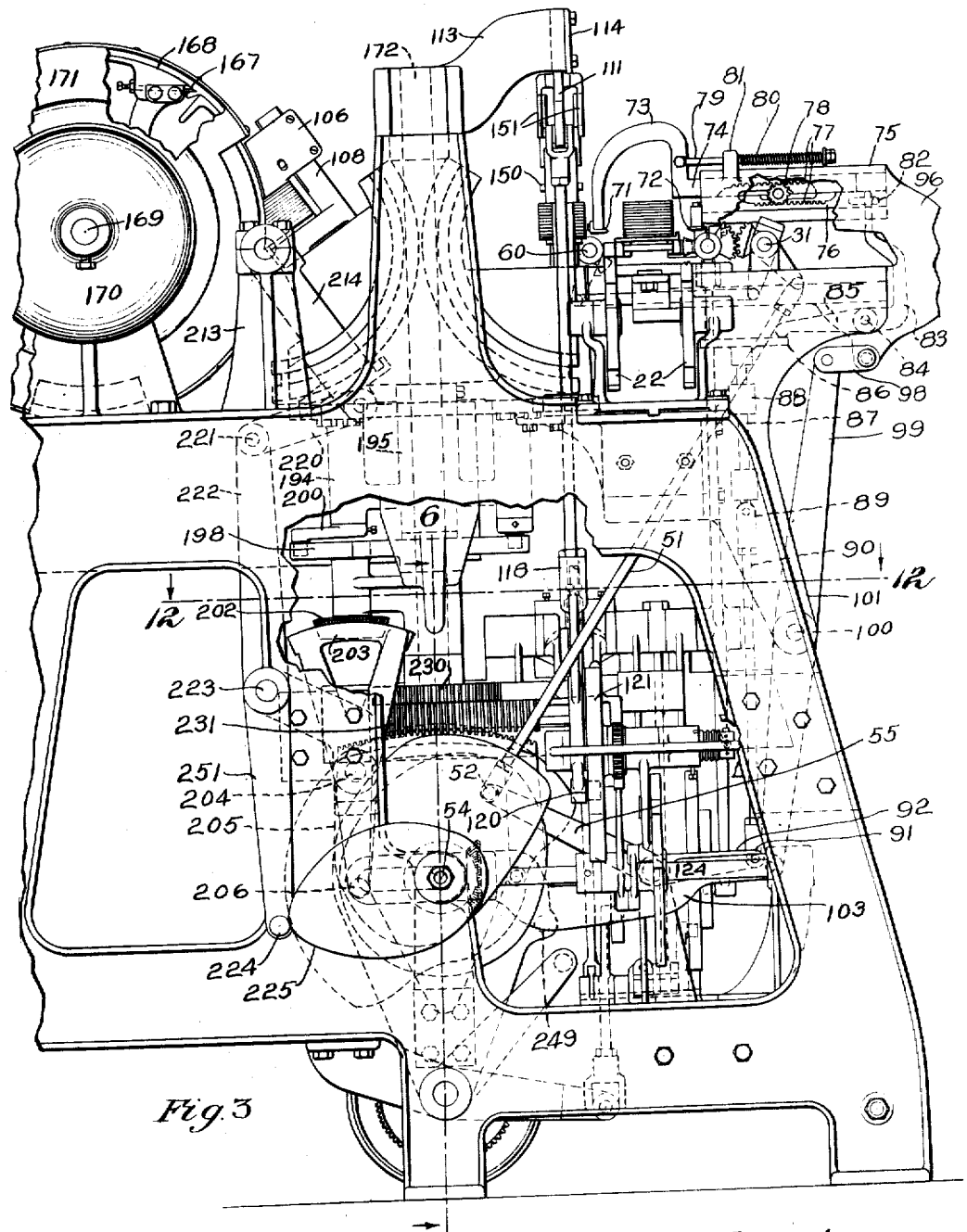
Figure 15:
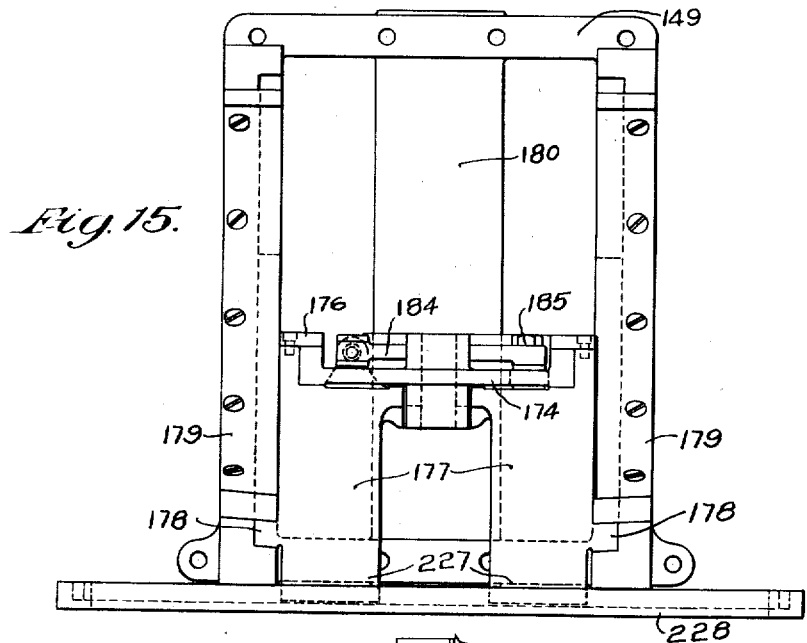
Figure 16:
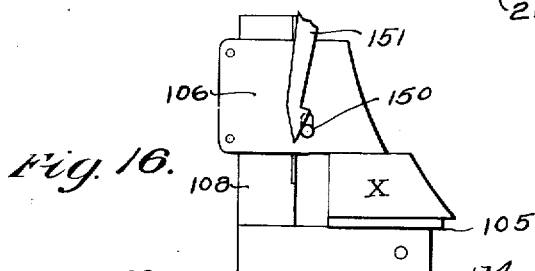
Figure 17:
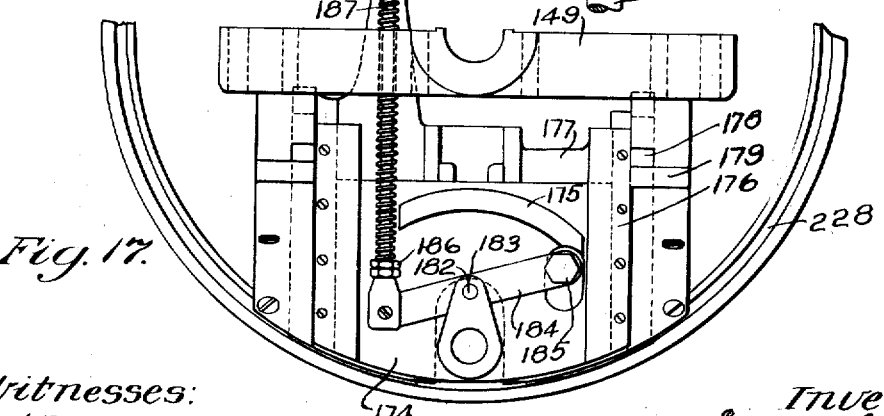

In the drawings, Figure 1 is a front elevation of a heel-shaping machine embodying the present invention, portions of the frame of the machine being shown as broken away to disclose the mechanisms behind these portions; Fig. 2 is a rear elevation of the machine of Fig. 1, with the shaping-cutter and a portion of the frame removed to disclose parts of the mechanisms concealed thereby; Fig. 3 is a side elevation of the machine, with parts of the frame broken away; Fig. 4 is a vertical section on the line 4—4 in Fig. 1, the shaping-cutter casing being removed; Fig. 5 is a plan view of details of the mechanism for operating the heel-clamp; Fig. 6 is a vertical section of the lower part of the machine, on the line 6—6 in Fig. 3, looking in the direction of the arrows; Fig. 7 is a plan view of the details of the mechanism for operating the heel-clamps, taken in section substantially on the line 7—7 in Fig. 2; Fig. 8 is a plan view of the cam-mechanism for swinging the heel-clamps during the shaping operation; Fig. 9 is a plan view of means for transferring the heels from the conveyer-chain to the heel-clamps, showing also a detached heel-clamp in coöperative relation with the transferring mechanism; Fig. 10 is a vertical section on the line 10—10 in Fig. 9, looking in the direction of the arrows; Fig. 11 is an elevation of the transferring mechanism of Fig. 9, with parts shown in section looking in the direction of the arrow 11; Fig. 12 is a horizontal section on the line 12—12 in Fig. 3; Fig. 13 is a plan view of the guide for locking the heel-clamp-rocking mechanism during rotation of the heel-carrier; Fig. 14 is a vertical section, on a median plane extending frontwardly and rearwardly of the machine, showing one of the heel-clamps and its supporting mechanism in coöperative relation with the shaping-cutter; Fig. 15 is a rear elevation of a part of the heel-clamp-supporting mechanism; Fig. 16 is a side elevation of one of the heel-clamps, showing also one of the clamp-releasing hooks; and Fig. 17 is a plan view of the parts shown in Fig. 15.

The rough heels upon which this machine is to operate are preferably blocks of leather board of generally cubical form which may be produced in an automatic heel block sawing machine forming the first machine in a system of machines for automatically producing heels. It is intended that the machine embodying the features of the present invention will form the second machine in this system.

The illustrated embodiment of the invention comprises a conveyer-chain upon which rough heels are brought into the machine, transferring mechanism by which the heels are removed from the conveyer, a rotatable heel-carrier provided with two heel-clamps, to which the heels are successively transferred by the transferring mechanism, and from which they are subsequently removed by the latter to be replaced upon the conveyer, and a shaping-cutter to which the heels are presented by the heel-carrier, together with mechanism for operating these parts in timed relation and for transversely and angularly moving the heel-clamps, during the shaping operation, to produce heels of the required size and pitch.

The conveyer-chain, as shown particularly in Figs. 1, 3 and 4, is located near the front of the machine and is illustrated as extending indefinitely to the left thereof, either to a convenient point for placing rough heels on the conveyer by hand, or to another machine or a feeding device by which the rough heels are automatically placed upon the conveyer. The conveyer-chain is supported and guided by sprocket-wheels 22 and 23 journaled upon the frame of the machine. The conveyer-chain comprises, as shown particularly in Figs. 9, 10 and 11, a series of links comprising flat horizontal plates 21, provided with upwardly-extending flanges 24 at their front and end edges, by which the rough heels are confined upon the plates. The flanges at the ends of the plates constitute also abutments, against which the breasts of the rough heels are placed and thus act as gages to determine longitudinally the location of the heels upon the conveyer, as shown in Fig. 1, the heels being indicated by the reference letter X. The heels are so located, either manually or by such automatic means as may be employed to feed the heels to the conveyer. As heretofore pointed out, it is contemplated that the automatic means for loading the conveyer will be embodied in an automatic heel block sawing machine.

Each chain-link is provided with downwardly extending flanges 26 which are pivotally connected, at the ends of the links, by transverse pivot-rods 25. The portion of the conveyer-chain which is in operative relation with the transferring mechanism is supported upon a guide 27 having an elongated raised central portion upon which the pivot-rods 25 rest, as shown in Figs. 10 and 11.

Means is provided for feeding the conveyer intermittently through the space of one link, and then locking the chain during the operation of the transferring mechanism, whereby the links and the rough heels carried thereby are brought successively into and retained in coöperative relation with said mechanism. For the purpose of feeding the conveyer the pivot-rods 25 are extended, at the front of the conveyer, to afford bearings for rolls 28. These rolls are adapted to be engaged and embraced by two lugs 29 extending from a sleeve 30, which is loosely journaled on a rod 31. The sleeve is free to rock independent of the rod, but is constrained to move longitudinally therewith by means of two collars 32 and 33 engaging the ends of the sleeve and fixed to the rod. The rod slides longitudinally in lugs 34 and 35, which are mounted on the base-portion of the guide-member 27. To impart longitudinal movements to the rod and the sleeve, the rod has a screw-threaded portion 36 which is engaged by a split nut 37 normally clamped in position by a screw 38. The nut is pivotally connected with two links 39, which are pivoted on a pin 40 in the upper end of a cam-lever 41. The cam-lever is loosely pivoted on a stud shaft 42 fixed on the frame of the machine, and at the lower end of the cam-lever is a cam-roll 43 engaging a cam 44 carried by a cam-shaft 45 also journaled on the frame of the machine (see Fig. 1). When the lugs 29 are in engagement with one of the rolls 28, the longitudinal movement of the slide-rod 31 and the sleeve 30, produced by the mechanism just described, results in a corresponding forward movement of the upper portion of the conveyer, this movement being in the direction of the arrows 69 in Figs. 1 and 9.

During the return movement of the slide-rod 31 and the sleeve 30 it is necessary to disengage the lugs 29 from the roll 28, which is accomplished by rocking the sleeve on the slide-rod. This rocking movement is produced by mechanism comprising a gear-segment 46 on the sleeve and an elongated gear-segment 47 engaged thereby. The gear-segment 47 is pivotally mounted on a rod 48 fixed in brackets 49 on the frame of the machine. It is provided with an arm 50 pivoted to the upper end of a rod 51, which carries at its lower end (Fig. 1) a cam-roll 52 engaging a cam 53 on a transverse cam-shaft 54, shown particularly in Fig. 6. The cam-roll and the rod are guided by a distance-arm 55 which is pivoted at one end to the rod, and at the other end upon a pivot-rod 56 mountd in the frame of the machine. The mechanism just described operates to rock the sleeve 30, at the end of the conveyer-feeding movement, so as to disengage the lugs 29 from the roll 28. The slide-rod 31 and the sleeve are then moved longitudinally, as before described, so as to bring them into position to coöperate with the next feeding-roll 28 on the conveyer. At the end of this longitudinal movement the sleeve is rocked back to engage the lugs with said roll.

To lock the conveyer between the feeding movements, the pivot-rods 25 are extended at the inner edge of the conveyer to afford bearings for rolls 57. The locking mechanism comprises lugs 58 adapted to engage and embrace one of the rolls 57, these lugs extending from a sleeve 59 journaled on a rod 60 mounted in brackets 61 on the base-portion of the conveyer-guide 27. The lugs 58 are moved into and out of engagement with the locking-rolls at the proper times by rocking the sleeve 59. This is accomplished by mechanism comprising an arm 62 depending from the sleeve, a connecting-rod 63 pivoted to one end of the arm, and an arm 64 depending from the gear-segment 47 and pivoted to the other end of the connecting-rod. When the gear-segment is rocked in one direction to disengage the lugs 29 from one of the feeding-rolls the mechanism just described operates to engage the locking-lugs 58 with one of the locking-rolls, while the reverse movement of the gear-segment 47 produces opposite results.

The connection comprising the threaded portion 36 on the slide-rod 31 and the split nut 37 affords means by which the conveyer-feeding mechanism may be adjusted to move the conveyer into positions in which the locking-rolls will be accurately engaged by the locking-lugs.

The feature of the machine described in the last few preceding paragraphs is not claimed herein as it is made the subject matter of a divisional application Serial No. 816,724, filed February 5, 1914.

As the longitudinal position in which the rough heels are presented by the conveyer to the other portions of the machine depends upon the position in which the conveyer is brought to rest and locked, provision is made for adjusting the feeding and locking-mechanism bodily in the direction of the movement of the conveyer, and to this end the conveyer-guide 27 has a flat base supported upon a plate 65 (Figs. 1 and 10) constituting a fixed part of the frame of the machine. The guide is fixed to the plate by means of screws 66 threaded into the guide and engaging elongated openings 67 in the plate 65 (shown in dotted lines in Fig. 9). When the guide is longitudinally adjusted upon the plate it carries with it the portions of the feeding and locking-mechanism which directly coöperate with the conveyer, since these parts, as already described, have bearings mounted upon the guide, and thus the parts are maintained in proper coöperative relation regardless of this adjustment.

The heels are transferred from the conveyer to the heel-carrier and back again by a transferring mechanism comprising two jaws 71 and 72 which are provided with teeth, as shown in Fig. 9, adapted to engage and securely hold the sides of the heels. These jaws move simultaneously, through equal distances, in opposite directions, so that whatever the width of a rough heel may be, or however it may be placed transversely on the conveyer, the jaws act automatically to bring the longitudinal axis of the heel to a definite position. The mechanism for moving the jaws in this manner is illustrated particularly in Fig. 3. The jaw 71 is carried on an overhanging arm 73 integral with a horizontal slide 74 which moves in a bracket 75. The jaw 72 is carried by a second horizontal slide 76 moving beneath the slide 74 in the bracket 75. The adjacent surfaces of the slides are cut away and formed as racks 77, and these racks are connected by a pinion 78 journaled in fixed position in the bracket. The pinion and the racks operate to co-ordinate the movements of the slides and the jaws in the manner above described.

The transferring jaws are moved toward and into engagement with the heel by a spring-mechanism comprising a rod 79 fixed at one end to the arm 73, and sliding loosely in a lug 81 on the bracket 75. A compression-spring 80 mounted on the rod 79 engages, at one end, the lug 81 and at the other end is connected with the rod. This spring tends constantly to move the transferring jaws toward each other. The transferring jaws are moved away from each other by cam-mechanism. A pin 82 projects laterally from the slide 76, through a slot in the bracket 75, as shown particularly in Figs. 1 and 3. This pin is engaged by an arm 83 extending upward from a rock-shaft 84. A second arm 85, fixed to the rock-shaft, engages the upper surface of a plate 86 carried at the upper end of a rod 87 which slides in lugs 88 on the frame of the machine. An adjustable pivot-joint 89 connects the lower end of the slide-rod 87 with a connecting rod 90, of which the lower end has a pivotal connection 91 with one arm 92 of a bell-crank cam-lever. The other arm 93 of the cam-lever carries a cam-roll 94 engaging a cam 95 on the transverse cam-shaft 54, as shown particularly in Fig. 6. This mechanism operates to move the transferring jaws apart and to hold them apart while the conveyer is moving to bring a fresh heel between the jaws. The jaws are then released which allows them to move together and grip the rough heel by the action of the spring 80. Subsequently they are moved apart again to release the heel after it has been inserted in the heel-carrier, and they are then held apart until another heel, which has been shaped, is brought between them. The transferring jaws are then brought together again to grip the shaped heel until the latter has been transferred from the heel-carrier to the conveyer, and finally the jaws are again moved apart to release the shaped heel and receive the next rough heel.

To produce the bodily movements of the transferring jaws and their operating mechanism above described, by which the heels held by the transferring jaws are moved from the conveyer to the heel-carrier, and vice-versa, the bracket 75 is formed integral with an upward extension 96 from a slide 97 (Figs. 1 and 3) which moves horizontally in a guide on the frame-member 65. The movements of this slide are produced by cam-mechanism comprising a link 98 pivoted to the slide and to the upper end of a lever 99, which is pivoted at 100 upon the lower end of brackets 101 on the frame of the machine. As shown particularly in Fig. 4, the lower end of the lever 99 is pivoted at 102 to one end of a bar 103, of which the opposite end is slotted so as to embrace and be guided upon the cam-shaft 54. The bar 103 carries a cam-roll 104 which engages a cam 105 on the cam-shaft 54 (Fig. 6). By the operation of this mechanism the transferring jaws, after gripping a rough heel, are moved rearwardly to transfer the heel from the conveyer to the heel-carrier, and later, after receiving a shaped heel from the heel-carrier, they are moved forwardly again to deposit the heel upon the conveyer. The mechanism previously described, comprising the arm 85 and the plate 86, is employed in order that this general movement of the parts may not interfere with the operation of the mechanism for moving the transferring jaws toward and from each other.

The heel-carrier hereinbefore referred to, by which the heels are carried to and from the shaping-cutter, is provided with heel-holding means in the form of clamps, two of these clamps being employed so that one may operate to hold a heel during the shaping operation, while the other is in position to coöperate with the heel-transferring mechanism just described. Each heel-clamp comprises (as shown particularly in Fig. 14), a pattern-plate 105 upon which the heel rests in an inverted position, and a clamping-jaw 106 adapted to clamp and hold the heel against the pattern plate. The pattern-plate is supported upon a base 107 having an upwardly-projecting post 108 upon which the jaw slides. The pattern-plate is removably mounted upon the base, being perforated to receive loosely the upper ends of a shaft 109 and a pin 110 fixed in the base, the shaft and pin acting to position the pattern plate thereon.

The rough heel is transferred from the conveyer to one of the heel-clamps by the transferring mechanism above described, and at this time the clamp-jaw is held in raised position by means of a lever 111 (Figs. 1 and 5), having a downward projection 112 adapted to engage the top of the jaw. The clamp-lever 111 is guided vertically in a recess formed between a yoke 113, constituting a part of the frame of the machine, and a plate 114 fixed to the front of the yoke. The lever has an upward projection sliding in this recess, and it is further guided by a pin 115 projecting from the lever into a curved slot 116 in the plate 114.

As the machine is intended to operate upon rough heels of varying thickness, two movements of the clamp-lever and the clamp-jaw are required to throw the latter into clamping position, the first movement being of indefinite extent according to thickness of the heel, and the final movement being a short positive movement by which the jaw, after it has been brought loosely into engagement with the heel is pressed with the required degree of force against the heel. The first movement of the clamp-lever is produced by moving its left-hand end, and for this purpose this end of the lever has a pivotal connection 117 with the upper end of a rod 118, of which the lower end is slotted so as to embrace and be guided by a cam-shaft 119 journaled on the frame of the machine. The rod 118 is actuated by a cam-mechanism shown particularly in Figs. 1, 6 and 12. The lower ends of the rod carries a cam-roll 120 which engages a spiral groove in the back of a cam 121 fixed to the cam-shaft 119. A torsion spring 146 is fixed at one end to a collar 147 on the cam shaft and the other end of the spring is fixed to the frame-bracket 148 in which the shaft is journaled. This spring tends constantly to rotate the cam in the direction of the arrow in Fig. 2 so as to draw the rod 118 downward. This movement is normally prevented, however, and the cam held in the position of the drawings by mechanism comprising a pinion 122 fixed to the cam and a segmental gear 123 meshing with the pinion and loosely pivoted on a cam-shaft 124 journaled in the frame of the machine below the shaft 119. An arm 125, fixed to the segmental gear, is connected by means of a connecting-rod 126 with one end of a cam-lever 127 which is loosely pivoted on the shaft 119. This lever carries a cam-roll 128 which engages the periphery of a cam 129 fixed on the cam-shaft 124. A portion of the periphery of this cam is circular, and when the cam-roll is upon this portion the parts are maintained in the position illustrated. At the time, however, when the clamp-lever 111 is to be operated, the cam-roll encounters a steep drop 130 on the cam-surface, and the cam-lever thereupon is allowed to fall and the spring 146 operates, as above described, to rotate the cam 121 and pull down the rod 118. This movement continues until the clamp-jaw rests against the upper surface of the heel which prevents further motion. The spiral cam 121 and the cam-roll 120 operate as an irreversible mechanism, so that after the cam has been rotated as just described, no amount of upward pull on the rod 118, due to the action of the secondary mechanism for operating the clamp-lever 111, can act to rotate the cam 121 in a reverse direction.

The mechanism for drawing down the right-hand end of the clamp-lever 111 to apply the final positive movement to the clamp-jaw comprises a rod 132 pivoted on a pin 131 at the end of the clamp-lever. The lower end of the rod 132 is pivoted to a crank-pin 133 mounted in crank-arms 134 fixed to the crank-shaft 42, as shown particularly in Figs. 2 and 12. These arms are arranged in such position that a slight downward movement brings the rod 132 substantially into straight-line position with the arms, so that these members act as a toggle and are capable of applying considerable force to the clamp-lever. The rock-shaft 42 is rocked by means of an arm 136, to which a rod 137 is pivoted. The lower end of this rod is provided with a pin 138 engaging slots in the end of an arm 139 fixed on a rock-shaft 140. The rock-shaft 140 is journaled in the frame of the machine and carries an arm 141 provided at its upper end with a cam-roll 142 engaging a cam 143 on the cam-shaft 45. The mechanism just described operates to impart a slight downward positive movement to the clamp-lever after the clamp-jaw has been set as before described, so as to force the jaw firmly into engagement with the rough heel and to compress the substance of the heel. This movement may be adjusted in amplitude by moving the pin 138 in the slots in the arm 139, thereby increasing the effective length of the latter. For this purpose the pin 138 carries a collar (Fig. 7) in which is threaded an adjusting-screw 144 arranged to turn in a sleeve on the hub of the arm 139. This screw is provided with a milled head 145 by which it may be turned when necessary. After the clamp-jaw has been thrown into operative position, as just described, it is retained therein by means of an automatic clutch embodied within the jaw, as shown in Fig. 14. The sides of the jaw are slotted to receive loosely a transverse clutch-roller 150 which coöperates with hardened steel plates 351 and 352 on the jaw post 108 and the jaw respectively. The plate 352 is arranged at a slight angle to the plate 351, and a spring-pressed plunger 353 tends constantly to press the roller into the narrow space so formed. When the jaw is depressed, as above described, the roller slides freely over the plate 351, but the slightest movement of the jaw in the opposite direction tends to pinch the roller between the plates and thereby to clamp the jaw upon the post. The lower surface of the clamp-jaw is provided with short spurs 354 to prevent lateral movement of the rough heel in the clamp during the operation of the shaping cutter.

After the operation upon a heel has been completed the clamp-jaw must be raised again from the finished heel to release it, and to this end means is provided for releasing the clutch and lifting the jaw. Hooks 151, pivoted at 152 on the clamp-lever 111, are connected by rods 153 with a double bell-crank lever 154 pivoted on the pin 131. This lever is operated by cam-mechanism to swing the hooks into and out of engagement with the projecting ends of the clutch-roller 150. To this end the bell-crank lever is connected with the upper end of a rod 155, of which the lower end is pivoted at 156 on levers 157 pivoted loosely on the rock shaft 42. Between the outer ends of the levers 157 is pivoted the upper end of a rod 158, of which the lower end is pivoted at 159, to one arm 160 of a bell-crank cam-lever loosely journaled on the rock-shaft 140. The other arm 162 of the lever carries a cam-roll 163 engaging a cam 164 on the cam-shaft 45. When a heel-clamp containing a shaped heel is brought into position beneath the clamp-lever 111, the latter is depressed, at its left-hand end, by mechanism hereinbefore described, the action of the mechanism at this time resulting from a second drop 166 (Fig. 6) in the surface of the cam 129, and the projection 112 on the clamp-lever thus descends into engagement with the clamp-jaw. At the same time the hooks 151 are swung, by the cam-mechanism last described, into operative position with their extremities engaging the ends of the clutch-roller 150. Upon the subsequent elevation of the clamp-lever, due to the action of the cam 129, the hooks operate, first, to raise the clutch-roller, thereby releasing the clutch, and then to raise the clamp-jaw from the heel so that the finished heel may be removed from the clamp by the transferring mechanism.

The operating tool by which the heels are shaped is in the form of a shaping-cutter, comprising a series of knives 167 adjustably mounted in a drum 168 carried by a shaft 169 journaled on the frame of the machine. A pulley 170 fixed to the shaft is connected with any suitable source of power, to rotate the cutter, and a casing 171 incloses the cutter with the exception of that portion by the heel.

The two heel-clamps constitute parts of a mechanism which may be described generally as the heel-carrier which is arranged to rotate to move the heel-clamps from the transferring mechanism to the cutter and vice-versa. To this end a vertical shaft 172 is journaled near its lower end in a horizontal member 173 of the frame of the machine and at its upper end in the frame-yoke 113. This shaft carries the heel-carrier, but between the shaft and the heel-clamps mechanisms are interposed to permit the several movements of the heel-clamps, with respect to the cutter, by which the heels are shaped to the desired pitch and outline. In order that the heel-clamp may be swung to produce the rounded outline of the heel, the clamp-base 107 (Fig. 14) is fixed to the upper end of a pivoted shaft 109. This shaft is journaled in a slide 174, which is provided with a curved projection 175 constituting an additional support for the clamp-base during the cutting operation. To permit the heel to be moved into, and held in, engagement with the cutter, the slide 174 moves in normally horizontal guides 176 (Figs. 15 and 17) in a cradle 177. To permit the rocking movement of the heel-clamp by which the required pitch is given to the heel, the cradle is provided with curved projections 178 which slide in segmental guides 179. The guides are connected by cross-arms 149 with a sleeve 180 fixed to the shaft 172 by means of a set-screw 181.

The several movements of the heel-clamp just described are produced by the following mechanisms: The slide 174 is provided with a lug 182 carrying a pivot-pin 183, to which a lever 184 is pivoted. One end of the lever is pivoted to a stud 185 projecting upward from the cradle 177 through an elongated opening in the slide. The other end of the lever 184 is pivoted to one end of a rod 187 which slides freely in a lug 188 on the cradle. A compression spring 189 is mounted upon the rod between the lug and adjusting nuts 186. This spring acts constantly, through the lever mechanism, to force the slide and the heel-clamp toward the cutter.

The heel-clamp is swung by cam-mechanism connected with the shaft 109. The lower end of this shaft is connected, by a universal joint 190, with a vertical shaft 191, which has a sliding joint (as shown in Fig. 4) permitting the shaft to accommodate its length to the rocking movements of the cradle. The lower end of the shaft is connected, by a universal joint 192, with a short vertical shaft 193 journaled in an arm 194 projecting from a sleeve 195. This sleeve is fixed to, and therefore rotates with, the heel-carrier. To the lower end of the shaft 193 is fixed an arm 196 carrying a cam-roll 197. In certain positions of the heel-carrier this cam-roll engages a horizontal cam 198 (which is shown particularly in Fig. 8). This cam is provided with a cam groove shaped like a horseshoe opened at both ends and with a hub loosely surrounding the shaft 172 and fixed to the frame-member 173, so that the cam does not rotate. When the heel-clamp is in its forward position the cam-roll engages the cam as shown at the right of Fig. 8, the lever 196 being in trailing position, the position of the pattern and rough heel at this time being indicated at $a$. When the heel-carrier is rotated by the shaft 172, in the direction of the arrow 213, to carry the clamp to the cutter, the cam-roll follows the cam until the pattern and heel reach the position designated by $b$. Here the cam-roll leaves the cam and enters a recess 199 in the end of an arm 200 which is fixed to the upper end of a rock-shaft 201 journaled on the frame-member 173 (Fig. 4). The arm 200 is then swung, during the shaping operation, in the direction of the arrows 211 in Fig. 8, so as to rock the shaft 193, and thus to swing the pattern and rough heel to a position substantially as indicated at $c$ and bring all the curved portion of the heel into engagement with the cutter. This movement of the arm 200 is produced by cam-mechanism comprising a pinion 202 on the lower end of the rock-shaft 201, and a segmental gear 203, shown particularly in Figs. 2 and 3. The segmental gear is fixed to a short rock-shaft 204 journaled on the frame of the machine, and this rock-shaft is provided with a depending arm 205 carrying a cam-roll 206 which engages a cam 207 on the cam-shaft 54. After the arm 196 and the heel-clamp have been swung as just described, the arm 200 swings back to the position of Fig. 8, while the resumption of the rotation of the heel-carrier causes the cam-roll 197 to enter the other end of the cam 198 at 208. At this time the arm 196 is in leading position with respect to the shaft 193. At this time the clamped heel is still in a reversed position similar to the position C (Fig. 8). In order that the position of the clamped heel may be reversed so that it may be returned to its original position *a* (Fig. 8) the cam 198 is provided with a pivoted latch 209, controlled by a spring 210, which acts to force the cam-roll 197 to the left into a pocket 386 while the latch closes behind it. Through this operation the arm 196 is swung again into trailing position, the pattern turning with the arrow 212. The heel-carrier is now returned to its original position *a* and the cycle of its movements may be repeated.

The rocking movements of the cradle 177 are produced by mechanism comprising a swinging frame pivoted at the upper ends of uprights 213 on the frame of the machine. This frame comprises two depending arms 214 and a cross-member 215 connecting the arms. A swinging motion is imparted to the frame through a lug 219, depending from the cross-member 215, having a link 220 pivoted at 221 to the end of an arm 222 fixed to a rock-shaft 223 (see Figs. 2, 3 and 14). The rock-shaft is mounted in suitable bearings supported on the frame of the machine and has an arm 251 provided with a cam-roll 224 in engagement with a cam 225 on the shaft 54. When a rough heel with a different pitch is to be shaped, this cam may be removed and another one substituted having a throw which will produce the required swing in the frame. For convenience in making this change, the cam 225 is secured to the outer end of the shaft by a nut as shown in Fig. 3.

The cross-member 215 carries a plate 216, removably secured thereto, by screws 217, which performs the double function of a cutter-blade to coöperate with the knives 167 of the cutter and of an abutment or guide against which the edge of the pattern-plate 105 rests. As shown in Fig. 14, the upper rear edge 218 of the plate 216 is located on the pivotal axis of the swinging frame, and this axis is located at the intersection of the plane of the pattern-plate and the periphery of the cutter, so that the knives 167 have a shearing action against the plate regardless of the swinging movements of the frame. As the cutter blades 167 move in a curved path the shaping cutter and plate 216 coöperate to shear curved slices from the work to give the heel the desired concaved appearance. It is apparent from an inspection of Fig. 14 that the axis about which the heel is swung during the shaping operation passes through the point of separation of the curved slice from the work. The cradle 177 participates in the swinging movements of the frame, through a connection comprising depending segmental lugs 227 on the cradle and lugs 226 on the cross-piece 215 which are slotted to receive the lugs 227. When the parts are in the position of Fig. 14, the lugs are in engagement with each other and as the center of curvature of the segmental guides 179 corresponds with the pivotal axis of the swinging frame, the heel-clamp mechanism swings freely with the frame. At the same time the spring-mechanism by which the clamp slide 174 is controlled maintains the pattern-plate 105 in engagement with the cutting-plate 216, as shown in Fig. 14, thereby limiting the movement of the rough heel toward the cutter, and the outline of the heel is thus determined by the pattern-plate. It is apparent that a heel of any desired size and shape may be produced by selecting the proper pattern-plate to give shape to the part to be in contact with the heel-seat of the shoe and changing the cam 225, as has been described, to give the proper pitch or taper from top to bottom.

In the normal vertical position of the swinging frame, the slots in the lugs 226 stand exactly in line with the ends of a slotted guide ring 228 of generally-circular form, which is fixed upon the frame of the machine (Figs. 4, 13 and 17). When the heel-carrier is rotated, therefore, the lugs 227 move into the guide 228, and the cradle and the heel-clamp are thus held in normal position while the heel-clamp is moved to and from the front of the machine to receive a fresh heel. Fig. 13 is a plan of the guide ring 228 showing the opening which will allow the heel-carrier to swing.

The intermittent rotation of the shaft 172 and the heel-carrier is produced by mechanism comprising a pinion 229 fixed on the lower end of the shaft (Figs. 2, 4, 6 and 12). This pinion is engaged alternately by a locking-rack 230 and an actuating-rack 231, which are provided, as shown in Fig. 6, with cylindrical surfaces, so that they may be swung alternately into engagement with the pinion about an axis lying substantially in the plane of the latter. The rack 230 forms an integral part of an elongated frame comprising a bar 232 and end-members 233 connecting the rack and the bar. These end-members are loosely pivoted on a rod 234 which is mounted at its ends in brackets 235 and 236 on the frame of the machine. These brackets confine the frame against endwise motion but it is free to rock on the rod so as to throw the locking-rack into and out of engagement with the pinion. This rocking movement is produced by mechanism comprising an arm 237 integral with the frame and pivoted at 238 (see Fig. 2) to the upper end of a rod 239, of which the lower end is pivoted, at 240, (see Fig. 4) to a bell-crank lever 241 loosely mounted on a shaft 242 fixed in the frame of the machine. The bell-crank lever has a second arm 243 carrying a cam-roll 244 which engages a cam 245 on the transverse cam-shaft 54.

The actuating rack 231 is provided with a hub 246 loosely mounted on the rod 234 and free to rock thereon. This hub is also free to slide on the rod, as it is shorter than the frame of which the locking-rack forms a member. The rocking movements of the actuating-rack are produced by the rocking movements of this frame, since the actuating rack is closely embraced thereby, as shown in Fig. 6, and the cam-mechanism heretofore described operates to throw the two racks alternately into engagement with the pinion 229. After the actuating-rack has been so engaged with the pinion, it is moved longitudinally to rotate the pinion and thus to rotate the shaft 172 and the heel-carrier. To this end the lower portion of the actuating-rack is engaged by a segmental gear 247 carried upon arms 248 pivotally mounted on the shaft 242 (Figs. 4 and 6). One of these arms carries a cam-roll 249 which engages a cam 250 on the transverse cam-shaft 54. This cam acts to swing the segmental gear at the proper time and thus to move the actuating-rack longitudinally and rotate the heel-carrier. After this movement has been completed the actuating-rack is rocked out of, and the locking-rack into, engagement with the pinion 229, so that the heel-carrier is locked against accidental rotation while the trimming-cutter is operating on a heel and the transferring mechanism is performing its functions. While the parts are so locked, the actuating-rack is given a reverse longitudinal movement by its cam-mechanism, to bring it into position to again rotate the pinion, and thus the rack-mechanism operates to rotate the heel-carrier intermittently through successive half rotations in the same direction.

The feature of the machine described in the last few preceding paragraphs is not claimed herein as it is made the subject matter of a divisional application, Serial No. 816,725, filed February 5, 1914.

The several cam-shafts from which the various mechanisms heretofore described derive their movements are rotated by mechanism comprising a pulley 252, which is loosely journaled on one end of the shaft 242 (Fig. 6). To this pulley is fixed a pinion 253 which meshes with a pinion 254 (Fig. 12) fixed on the transverse cam-shaft 54. The cam-shafts 45 and 124 are driven, respectively, by bevel-pinions 255 and 257 fixed on the cam-shaft 54 and engaging pinions 256 and 258 fixed on the cam-shafts 45 and 124.

The general operation of the machine is as follows: The conveyer-chain having come to rest with a rough heel between the jaws of the transferring mechanism, these jaws close upon the heel and move it into position upon the pattern-plate of one of the heel-clamps, which at this time is in stationary position opposite the jaws. The transferring jaws then open to release the heel, while the clamp-jaw descends and clamps the heel against the pattern-plate. The heel-carrier then makes a half rotation, thus carrying the rough heel to the shaping-cutter, and at this time the transferring jaws remain in their inward position, since the arm 73 is so arched as to permit the heel-clamp to move beneath it. The half-rotation of the heel-carrier brings the second heel-clamp to the front of the machine, and brings the shaped heel, which has been previously operated upon, between the transferring jaws, which thereupon close upon the heel and are then retracted to deposit the finished heel on the unoccupied link of the conveyer-chain. While this last operation is occurring, the rough heel previously introduced, as just described, is in engagement with the shaping-cutter and is shaped by the latter, the appropriate mechanisms operating at this time to move the heel-clamp angularly to produce a heel of the required shape. During this latter operation the conveyer-chain is advanced for the space of one link, thereby removing the shaped heel from the transferring mechanism and substituting another rough heel, and the cycle of operation is thereby completed. The finished heels, after being conveyed away from the transferring mechanism by the conveyer, may be either conducted to a machine for further operating upon them, or may be discharged from the conveyer when it passes over the sprockets 23.

The rough heels on which the machine operates may be of various kinds, and in the broadest aspect of the invention, while the mechanism hereinbefore described is particularly useful in connection with a heel-shaping machine, the operation performed upon these heels need not necessarily be a shaping operation performed by a cutter, since the general organization of the machine, including the transferring mechanism, the rotary heel-carrier, and the plurality of angularly movable heel-clamps, together with various features of the mechanism by which these parts are operated, are applicable to machines for performing various operations upon heels.

What is claimed as new, is:—

1. A machine for operating on shoe-heels, having, in combination, a tool, a heel-clamp, and mechanism operating automatically to introduce a rough heel into the heel-clamp, to close the heel-clamp upon the heel, and to produce a relative movement of the heel-clamp and the tool to cause the latter to engage and operate on the heel while said heel is still held in the heel-clamp, substantially as described.

2. A machine for operating on shoe-heels, having, in combination, a tool, a rotary heel-carrier, means for feeding rough heels automatically to the heel-carrier, and means for rotating the heel-carrier automatically to bring a heel therein into engagement with the tool, substantially as described.

3. A machine for operating on shoe-heels, having, in combination, a tool, a heel-clamp, and mechanism operating automatically to introduce a rough heel into the heel-clamp, to close the heel-clamp upon the heel, to produce a relative movement of the heel-clamp and the tool whereby the latter is caused to engage and operate on the heel, and to produce a relative angular movement of the heel-clamp and the tool, during the operation of the tool on the heel, substantially as described.

4. A machine for operating on shoe-heels, having, in combination, a tool, a movable heel-carrier, means for feeding rough heels automatically to the heel-carrier, means for moving the heel-carrier automatically to bring a heel therein into engagement with the tool, and means for producing a relative angular movement of the heel-carrier and the tool, during the operation of the latter, substantially as described.

5. A machine for operating on shoe-heels, having, in combination, a tool, a rotary heel-carrier provided with a plurality of heel-clamps and with supporting mechanism for the clamps arranged to permit angular movement thereof, means for feeding rough heels to the heel-clamps successively, means for rotating the heel-carrier to bring the heel-clamps successively into coöperative relation with the tool, and means operating automatically to move the heel-clamps angularly, when in such relation, substantially as described.

6. A machine for operating on shoe-heels, having, in combination, a tool, a rotary heel-carrier provided with a heel-clamp having a movable jaw, means movable with the heel-clamp for holding the jaw in closed position, mechanism at a fixed station for moving the jaw to closed position, and means for rotating the heel-carrier to move the heel-clamp from said mechanism and into coöperative relation with the tool, substantially as described.

7. A machine for operating on shoe-heels, having, in combination, a tool, a movable heel-carrier provided with a heel-clamp, mechanism at a fixed station for moving the heel-clamp angularly when in coöperative relation with the tool, and means for moving the heel-carrier to bring the heel-clamp into and out of coöperative relation with the tool and with said mechanism, substantially as described.

8. A machine for operating on shoe-heels, having, in combination, a tool, a movable heel-carrier provided with a heel-clamp having a movable jaw, mechanism at a fixed station for moving the jaw to closed position, mechanism at a fixed station for moving the heel-clamp angularly when in coöperative relation with the tool, and means for moving the heel-carrier to bring the heel-clamp into coöperative relation with said mechanisms successively, substantially as described.

9. A machine for operating on shoe-heels, having, in combination, a tool, a rotary heel-carrier provided with a plurality of heel-clamps having movable jaws, mechanism at a fixed station for moving said jaws to closed position, mechanism at a fixed station for moving the heel-clamps angularly when in coöperative relation with the tool, and means for moving the heel-carrier intermittently, through partial rotations, to bring the heel-clamps successively into coöperative relation with each of said mechanisms, substantially as described.

10. A machine for operating on shoe-heels, having, in combination, a rotary trimming-cutter, a heel-clamp, and mechanism operating automatically to introduce a rough heel into the heel-clamp, to close the heel-clamp upon the heel, and to produce a relative movement of the heel-clamp and the tool whereby the latter is caused to engage and operate on the heel, substantially as described.

11. A machine for operating on shoe-heels, having, in combination, a rotary trimming-cutter, a heel-clamp, and mechanism operating automatically to introduce a rough heel into the heel-clamp, to close the heel-clamp upon the heel, to produce a relative movement of the heel-clamp and the trimming-cutter whereby the latter is caused to engage and operate on the heel, and to produce a relative angular movement of the heel-clamp and the trimming-cutter substantially as described.

12. A machine for operating on shoe-heels, having, in combination, a trimming-cutter having two relatively-movable blades arranged to produce a shearing cut, a heel-clamp, and means for rocking the heel-clamp, during the operation of the cutter, about an axis coincident with the line of engagement of the cutter blades, substantially as described.

13. A machine for operating on shoe-heels, having, in combination, a trimming-cutter having two relatively-movable blades arranged to produce a shearing cut, a heel-clamp, and means for rocking the heel-clamp and one of said blades, during the operation of the cutter, about an axis coincident with the line of engagement of the blades, substantially as described.

14. A machine for operating on shoe-heels, having, in combination, a trimming-cutter having two relatively-movable blades arranged to produce a shearing cut, a pattern-plate, means for clamping a rough heel upon the pattern-plate, means for holding the edge of the pattern-plate in engagement with one cutter-blade with its heel-engaging surface in the plane of the cutting-edge of said blade, and means for rocking the pattern-plate and said blade, during the operation of the cutter, about an axis coincident with the line of engagement of the cutter-blades, substantially as described.

15. A machine for operating on shoe-heels, having, in combination, a trimming-cutter having two relatively-movable blades arranged to produce a shearing cut, a pattern-plate, means for clamping a rough heel upon the pattern-plate, means for holding the edge of the pattern-plate in engagement with one of the cutter-blades with its heel-engaging surface in the plane of the cutting edge of said blade, and means for swinging the pattern-plate, during the cutting operation, to cause the cutter to act progressively upon the periphery of the heel, substantially as described.

16. A machine for operating on shoe-heels, having, in combination, a heel-conveyer, a heel-carrier, a tool, means for transferring rough heels from the heel-conveyer to the heel-carrier, and means for rotating the heel-carrier into coöperative relation with the tool, substantially as described.

17. A machine for operating on shoe-heels, having, in combination, a heel-conveyer, a heel-carrier, a tool, means for transferring heels from the heel-conveyer to the heel-carrier and back again, and means for actuating the heel-carrier to bring the heel transferred thereto into and out of engagement with the tool, substantially as described.

18. A machine for operating on shoe-heels, having, in combination, a heel-clamp, means for introducing rough heels into the heel-clamp, said means having members engaging the heel at its sides and operating automatically to center the heel in the heel-clamp with respect to its longitudinal axis, a tool arranged to operate on the heel in the heel-clamp, and means for producing relative movements of the heel-clamp and the tool, during the operation of the latter, substantially as described.

19. A machine for operating on shoe-heels, having, in combination, a heel-clamp, means for feeding rough heels one by one, means for introducing the heels so fed into the heel-clamp, said means having members engaging the heel at its sides and operating automatically to center the heel in the heel-clamp with respect to its longitudinal axis, a tool, and means for producing relative movements of the heel-clamp and the tool, during the operation of the latter, substantially as described.

20. A heel shaping machine, having, in combination, a shaping cutter, a conveyer, and automatic mechanism for taking a rough heel from the conveyer, delivering it to the cutter for the shaping operation and placing the heel now finished back upon the conveyer, substantially as described.

21. A heel shaping machine, having, in combination, a link conveyer loaded with rough heels, one to a link, means for shaping the rough heels successively, and means for substituting a shaped heel for a rough heel upon each link of the conveyer, substantially as described.

22. A heel shaping machine, having, in combination, a cutter, a link conveyer loaded with rough heels, one to a link, delivering mechanism for picking a rough heel from a link of the conveyer, delivering it to the cutter, and placing a finished heel on the link of the conveyer, and mechanism for feeding the conveyer to bring another rough heel in position for the operation of the delivering mechanism and advance the finished heel away from said mechanism, substantially as described.

23. An automatic machine, having, in combination, a cutter, a work support, means for shearing off curved slices from the work supported on the work support, means for relatively actuating the work and cutter to cause the cutting to extend around the peripheral surface of the work, and means for tipping the work about an axis passing through the point of separation of the curved slice from the work, substantially as described.

24. A heel shaping machine, having, in combination, a shaping cutter, a slide carrying a heel support, means for forcing said support toward the cutter, and means for guiding the slide horizontally and also angularly about a fixed axis, substantially as described.

25. A heel shaping machine, having, in combination, a shaping cutter, a heel support, a controlling roll connected thereto, a horseshoe cam for guiding the heel support to and from the cutter, a swinging arm, means for causing the roll to pass out of one end of the cam and into the arm, means for swinging the arm with the roll therein to cause the cutter to traverse the peripheral surface of the heel, and means for causing the roll to pass out of the arm and into the other end of the cam, substantially as described.

26. An automatic machine, having, in combination, an operating tool, mechanism for supplying the machine with work, mechanism for feeding the work to and from the tool, means acting to move the work relatively to the tool during the operation of the tool, and means for correcting the position of the work after the operation of the tool to insure the removal of the work from the machine in its original presented position, substantially as described.

27. A heel shaping machine, having, in combination, a shaping cutter, a heel carrier arranged to receive a heel at a certain station, means for delivering heels one at a time to the carrier, means for rotating the carrier to bring the heel from the station to the cutter, means for then rotating the heel to cause the cutter to shape the peripheral surface of the heel from one breast corner to the other, and means for rotating both carrier and heel about independent axes to return the heel to its original position at the delivering station, substantially as described.

28. A heel shaping machine, having, in combination, a shaping cutter, a heel carrier arranged to receive a heel at a certain station, means for delivering heels one at a time to the carrier, means for swinging the heel from and around to the station, means for rotating the heel to cause the cutter to shape the peripheral surface of the heel from one breast corner to the other, said rotation causing the position in which the heel was received by the carrier at the delivering station to become reversed, and means for restoring the relative position of the carrier and heel, substantially as described.

ERASTUS E. WINKLEY.

Witnesses:
WARREN G. OGDEN,
RUTH A. SIMONDS.

It is hereby certified that in Letters Patent No. 1,102,310, granted July 7, 1914, upon the application of Erastus E. Winkley, of Lynn, Massachusetts, for an improvement in "Machines for Operating on Shoe-Heels," an error appears in the printed specification requiring correction as follows: Page 4, line 97, after the word "means" insert the words and period *hereinafter described. The clamp-jaw is then released and is pressed downwardly into firm engagement with the heel by means;* and that the said Letters Patent should be read with this correction therein that the same may conform to the record of the case in the Patent Office.

Signed and sealed this 25th day of August, A. D., 1914.

[SEAL.]

J. T. NEWTON,

*Acting Commissioner of Patents.*